(12) United States Patent
Budowski et al.

(10) Patent No.: US 6,827,231 B2
(45) Date of Patent: Dec. 7, 2004

(54) MINIVAN BOX LINER

(76) Inventors: Allan Budowski, 42 Westpark Drive, Ottawa, Ontario (CA), K1B 3E5; Robert Carriere, 346 St. Andrews Drive, Ottawa, Ontario (CA), L8K 5K7

( * ) Notice: Subject to any disclaimer, the term of this patent is extended or adjusted under 35 U.S.C. 154(b) by 141 days.

(21) Appl. No.: 10/316,062

(22) Filed: Dec. 11, 2002

(65) Prior Publication Data

US 2003/0106894 A1 Jun. 12, 2003

Related U.S. Application Data

(60) Provisional application No. 60/338,666, filed on Dec. 11, 2001.

(51) Int. Cl.[7] .............................................. B65D 19/18
(52) U.S. Cl. ..................................... 220/4.29; 220/4.28
(58) Field of Search .............................. 220/4.28–4.29, 220/4.31, 4.32, 4.33, 6, 7, 797, 801, 802

(56) References Cited

U.S. PATENT DOCUMENTS 3,360,152 A * 12/1967 Leers
3,692,204 A * 9/1972 Provi et al.
3,955,320 A * 5/1976 Serovy et al.
4,219,119 A * 8/1980 Zefran
4,673,087 A * 6/1987 Webb
4,828,132 A * 5/1989 Francis, Jr. et al.
5,161,709 A * 11/1992 Oestreich, Jr.
5,351,846 A * 10/1994 Carter
6,041,958 A * 3/2000 Tremelo

* cited by examiner

Primary Examiner—Joseph Man-Fu Moy
(74) Attorney, Agent, or Firm—Freedman & Associates

(57) ABSTRACT

A minivan box liner comprising a molded bottom plate having a bottom lip of a predetermined height formed about a perimeter thereof; a continuous wall comprising a plurality of panels and a plurality of hinge portions therebetween for permitting bending of the continuous wall at these hinge portions for disposing the panels with relative angles therebetween, the continuous wall for being disposed adjacent the bottom lip for being biased thereby in an inward direction relative to an enclosure formed by the continuous wall and the molded bottom plate; and, a molded top for being disposed adjacent the continuous wall and at a location opposite the bottom plate in an approximately parallel relationship thereto, whereby the top, the continuous wall and the bottom plate when assembled form an enclosure therein allowing access within the enclosure is disclosed.

43 Claims, 17 Drawing Sheets

MINIVAN BOX LINER

This application claims priority from U.S. Provisional Application No. 60/338,666 filed Dec. 11, 2001.

FIELD OF THE INVENTION

The present invention relates to a removable storage system for vehicle and more specifically to an adjustable box liner that can be disassembled when not in use.

BACKGROUND OF THE INVENTION

Minivans are presently very popular for family transport. One of the great advantages of the Minivan is its versatility. A minivan may perform family related transport functions on weekends and evenings while providing business transportation during the day. In order to meet these varying needs, minivans are designed with removable seats, fold down seats, and other storage related advantages while also supporting the creature comforts such as dual heating systems, airbags, ABS brakes, leather seats, and so forth. Unfortunately, in using a minivan for work related transport, often damage occurs to carpet walls and ceiling. Thus, there is a balance between suitable work functions for a "family" minivan. This often results in a need for two different vehicles even when one would suffice.

For work, mini vans are useful for transporting "heavy duty" material, for example heavy tools, as well as fragile cargo such as groceries. Of course, owners of "family" minivans do not wish to damage the inside walls and floor of the rear of the van while using their vehicle. Typically, owners of minivans who transport heavy tools, building materials and other heavy items in the cargo compartment of their vehicle have significant damage to that cargo area because while transporting these items, they often bounce and cause denting or damage to the carpet and plastic walls or ceiling. Since much of the minivan market is for "family" vehicles, the damage so caused reduces the vehicle's overall value.

In order to protect the interior of cargo vans or pickup truck beds, various systems were developed. Unfortunately, few if any of these systems are applicable to the "family" minivan. This is because they are not easily removed or stored. For a family vehicle, it is inconvenient to require an entire garage bay to store a liner or liner parts. Also, there is a distinct advantage in having the family vehicle transformable into a cargo vehicle simply, effectively, and at will without the inconvenience of additional storage areas or tools.

Prior art devices fail to achieve the above noted advantages. For example the liner for van cargo compartment disclosed in U.S. Pat. No. 4,917,431, to McDonald. McDonald teaches a liner that comprises a plurality of panels and when the desired positions of the panels are attained, holes are drilled through the panels to allow screws to be tightened until they secure themselves in the interior panels of the vehicle. Unfortunately, this results in a non-transformable vehicle.

To overcome the permanence of the McDonald system, Blyth et al. disclose, in U.S. Pat. No. 6,142,550, a van liner composed of reinforced plastic sections that are tightened together to form an insulated liner easily assembled, disassembled and transferred. The liner covers the whole cargo compartment. Unfortunately, the van liner disclosed by Blyth takes time for assembling and disassembling thereof. Furthermore, the numerous sections are difficult to store when the liner is disassembled. Moreover, the various components are suitable for one model of vehicle and the liner is difficult to assemble in another model of vehicle having different dimensions.

There are a number of desirable objectives in relation to cargo compartment liner inserts for vans, trucks, cars, and similar vehicles. Preferably, a liner is designed such that it is easily insertable and removable within the limited access space found in vans, station wagons or sport utility vehicles. It is also preferable to provide for a storage compartment that serves a dual protective function. A first protective function is by lining the interior surface of the vehicle cargo compartment, allowing transport of cargo easily accessible from the seating area of the vehicle. In absence of protective surface, the cargo could damage the interior of the vehicle, reducing its value. A second protective function is by protecting the cargo from the chocks due to the vehicle movements.

In U.S. Pat. No. 5,161,700, Stannis et al. disclose an adjustable storage system including a platform; at least a fixed side and a movable side slidably mounted to the platform. The movable side can be locked in a variety of approximately continuous adjusted position with respect to the fixed side to provide lateral support for packages. However, this adjustable storage system does not provide a protective liner for the vehicle's interior.

In U.S. Pat. No. 6,120,078, Smyl discloses a protective liner that comprises many panels removably and tightly connected by latch means; the panels forming an interior wall for a pickup truck box. The geometry of the device according to Smyl restricts its use to a specific geometry of vehicle. Specifically, though adjustable, the insert of Smyl cannot be transferred from one model of vehicle to anther model of vehicle unless the two models have their back wheels at the same location relatively to the tailgate, and the position of the passenger compartment. Further, the larger of the panels has to be precisely adjusted to allow the latch mechanism to function. Moreover, the latch mechanisms have to be easily accessible to facilitate the assembling and disassembling of the system. This implies that they are also easily damageable by the cargo. Potentially, the latch mechanisms can also damage the cargo in the charging and discharging process.

In minivans, station wagons or sport utility vehicles, the size of the cargo that is preferably carried corresponds more or less to the height of the back seat to avoid obstruction of the sight through the back mirror. Further, in case of accident, to avoid the cargo to fly through the car, it is preferable that no un-secured cargo passes over the back of the seat, which potentially endangers the passengers and/or the driver of the vehicle.

It would be advantageous to provide an adjustable storage device for storing and securing cargo in the trunk area of a minivan, station wagon, sport utility vehicles or any of this type of vehicle. A further asset would be to provide a system that operates in two modes, an assembled lining mode and a disassembled mode for storing thereof when not in use.

OBJECT OF THE INVENTION

It is an object of this invention to provide with a storage system easily assembled and positioned in a cargo space of a vehicle.

It is an object of this invention to provide with a stackable storage system when either in the assembled or disassembled mode of operation.

SUMMARY OF THE INVENTION

In accordance with a preferred embodiment of the present invention, there is provided a box liner comprising:

a molded bottom plate having a bottom lip of a predetermined height formed about a perimeter thereof;

a wall comprising at least one panel section including a plurality of panels and a hinge portion between two panels of the plurality of panels for permitting bending of the wall at the hinge portion for disposing the two panels with a relative angle therebetween, the two panels for having an end disposed adjacent the bottom lip with the hinge portion proximate a corner of the molded bottom plate, the portions for being biased by the bottom lip in an inward direction relative to an enclosure formed by the box liner and for being biased toward the bottom lip; and, a molded top for being disposed adjacent the wall and at a location opposite the bottom plate in an approximately parallel relationship thereto, whereby the top, the wall and the bottom plate when assembled form an enclosure therein allowing access within the enclosure.

In accordance with a preferred embodiment of the present invention, there is provided a box liner comprising:

a molded bottom plate having a bottom lip of a predetermined height formed about a perimeter thereof;

a sidewall comprising a plurality of panels and a plurality of hinge portions therebetween for permitting bending of the sidewall at these hinge portions for disposing the panels with relative angles therebetween, the sidewall for being disposed adjacent the bottom lip for being biased thereby in an inward direction relative to an enclosure formed by the sidewall and the molded bottom plate; and, a molded top for being disposed adjacent the continuous wall and at a location opposite the bottom plate in an approximately parallel relationship thereto, whereby the top, the sidewall and the bottom plate when assembled form an enclosure therein allowing access within the enclosure.

BRIEF DESCRIPTION OF THE DRAWINGS

Exemplary embodiments of the invention will now be described in conjunction with the following drawings, in which.

DETAILED DESCRIPTION OF THE INVENTION

Figure 1:
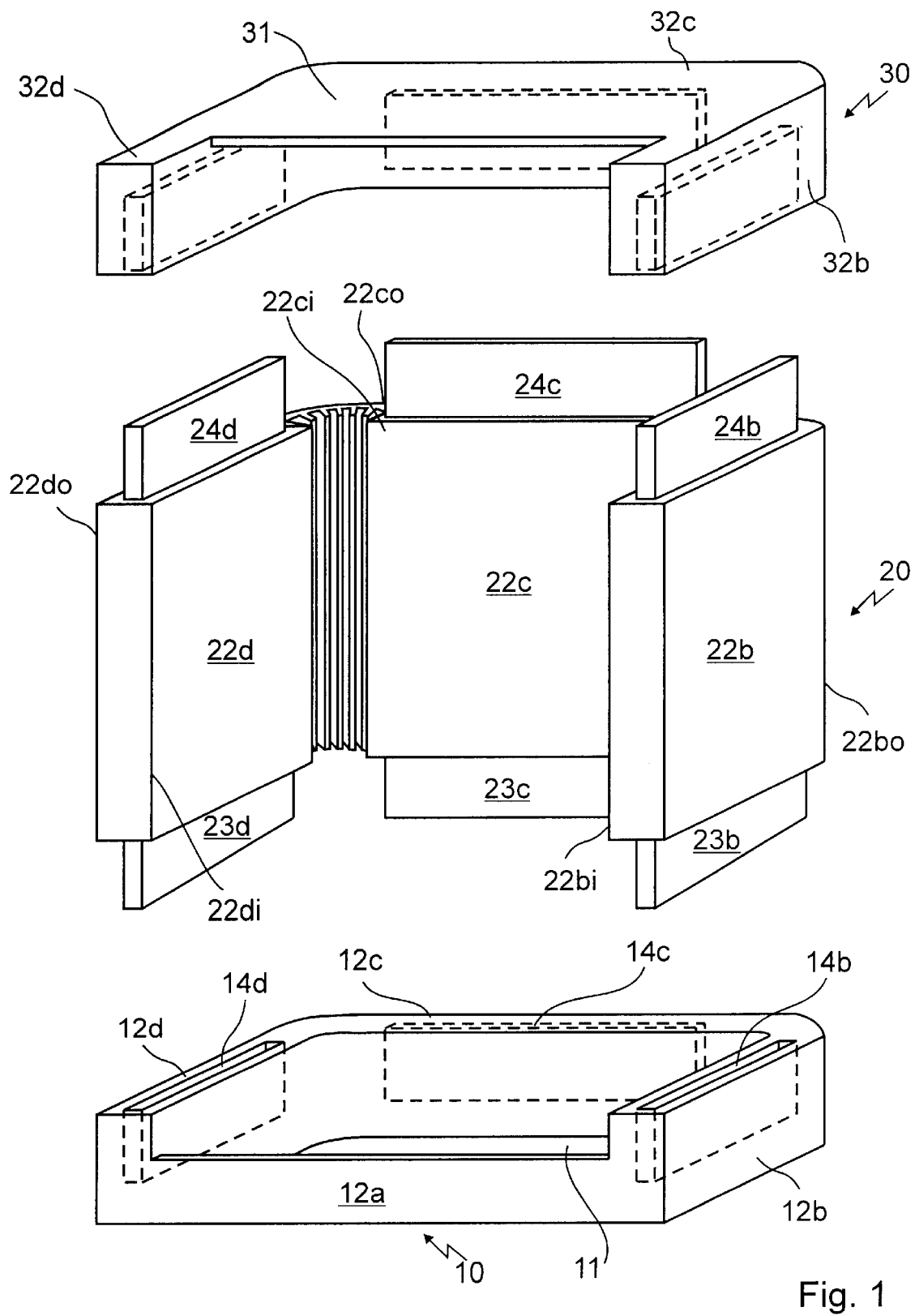
FIG. 1 is an exploded perspective view of a storage device according to a preferred embodiment.

Referring to FIG. 1, an exploded perspective view of a storage device according to a preferred embodiment is shown. The storage device, in the form of an opened box, comprises a bottom base 10, a sidewall part 20 and a top part 30.

The bottom base 10 comprises a bottom tray 11 having an approximately rectangular shape, which is surrounded by an upstanding flange comprising four vertically oriented walls 12a, 12b, 12c, 12d of a general parallelepiped shape attached to the four edges of the bottom plate 11. The bottom base 10 is preferably a molded rigid base wherein the mold comprises the bottom base and the upstanding flange.

Figure 2A:
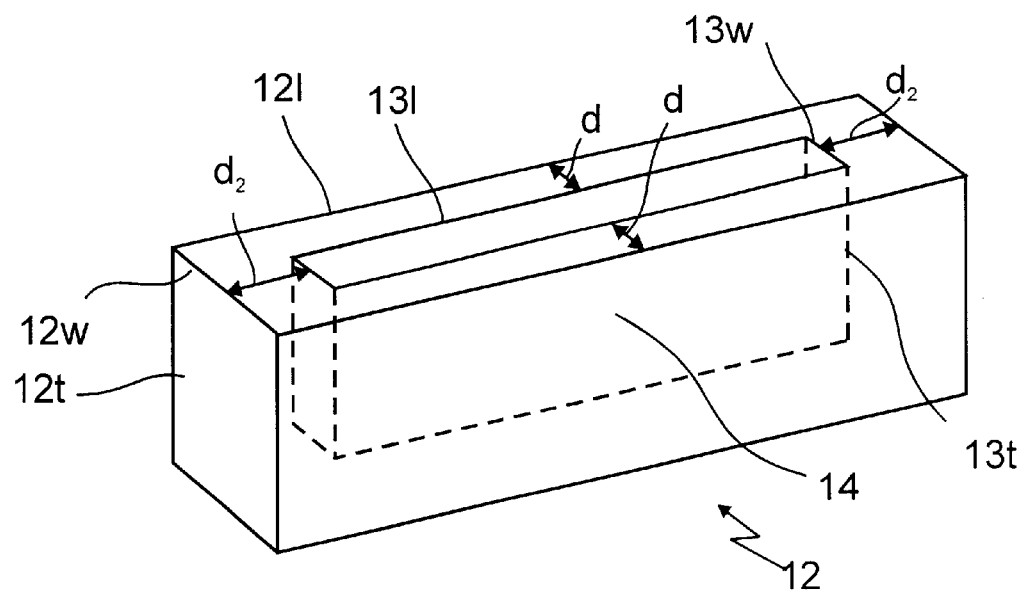
FIG. 2a is a perspective view of a wall corresponding to any of the walls 12b, 12c and 12d from FIG. 1.

Referring to FIG. 2a, perspective view of a wall of the upstanding flange corresponding to any of the walls 12b, 12c and 12d from FIG. 1 is shown. The wall 12 has a general parallelepiped shape delineated by sides of different measures. A long side having a length 12l longer than a small side having a width 12w and a thickness 12t. The wall 12 features a slot corresponding to a cavity 14. The cavity presents the same orientation as the wall 12. The cavity 14 has an approximately parallelepiped shape parallel to the wall. The cavity is delineated with walls formed by the interior of the wall having a length 13l, a width 13w and a thickness 13t. Each dimension of the cavity is smaller than the corresponding dimension of the wall; i.e. the length 13l of the cavity is smaller than the length 12l of the wall, the width 13w of the cavity is smaller than the width 12w of the wall and the thickness 13t of the cavity is smaller than the thickness 12t of the wall. Walls 12b and 12d are of identical size, whereas wall 12c is longer. Preferably, the length of the cavity is adjusted to the length of the wall.

Figure 2B:
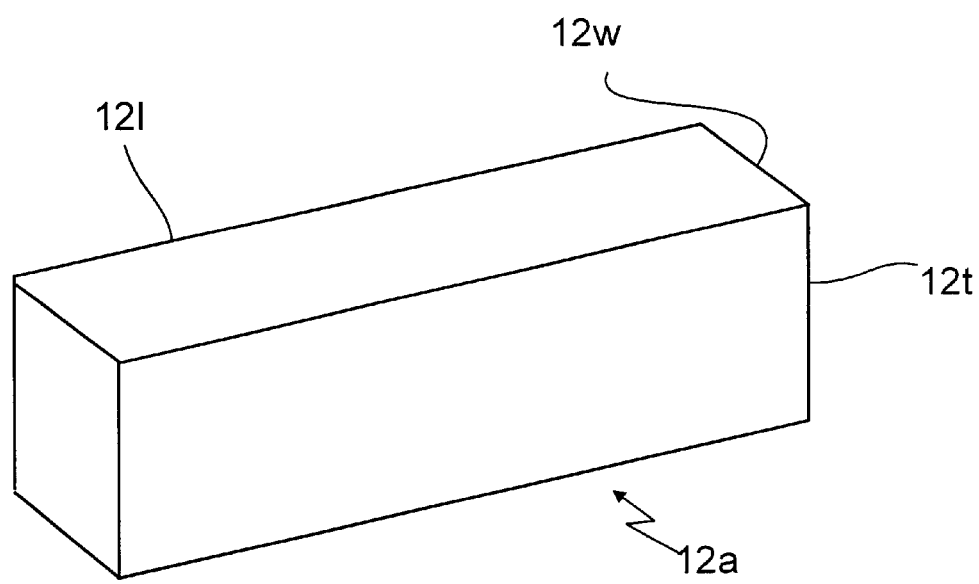
FIG. 2b is a perspective view of a wall corresponding to the wall 12a from FIG. 1.

Referring to FIG. 2b, a perspective view of the wall 12a of the upstanding flange from FIG. 1 is shown. The wall 12a has a general parallelepiped shape delineated by sides of different measures. A long side having a length 12l longer than a small side having a width 12w and a thickness 12t.

The length of the wall 12a is identical to the length of the wall 12c.

The wall 12a is positioned at an edge corresponding to the front edge of the bottom base 11. The wall 12c is attached to the edge opposite the front edge of the bottom base, i.e. the back edge, and walls 12a and 12c are spaced apart by walls 12b and 12d; they are attached respectively to the right and left edge of the bottom base. Each wall is attached to the bottom base through the side corresponding to the length of the wall, and each wall is attached to another wall through its smaller side. The four walls delineating an approximately rectangular area corresponding to the approximately rectangular bottom base 11.

Figure 2C:
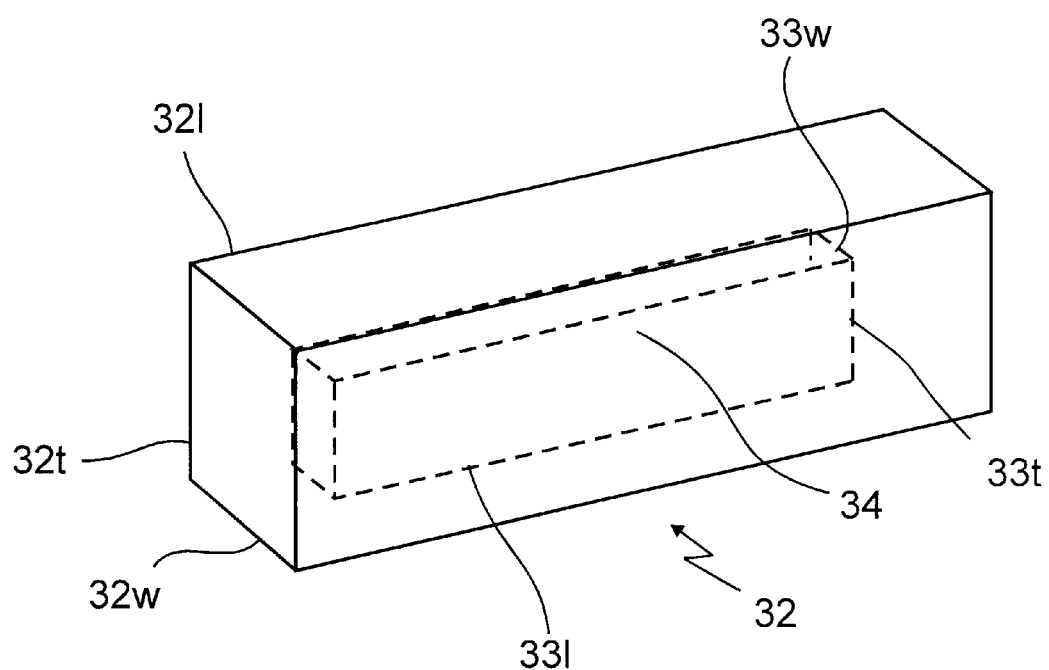
FIG. 2c is a perspective view of a wall corresponding to any of the walls 32b, 32c and 32d from FIG. 1.

Referring to FIG. 2c, perspective view of a wall of the depending flange of the top part 30 corresponding to any of the walls 32b, 32c and 32d from FIG. 1 is shown. The wall 32 has a general parallelepiped shape delineated by sides of different measures. A long side having a length 32l longer than a small side having a width 32w and a thickness 32t. The wall 32 has a cavity; the cavity has the same orientation as the wall 32. The cavity 34 has an approximately parallelepiped shape parallel to the wall. The cavity is delineated with walls formed by the interior of the wall having a length 33l, a width 33w and a thickness 33t. Each dimension of the cavity is smaller than the corresponding dimension of the wall; i.e. the length 33l of the cavity is smaller than the length 32l of the wall, the width 13w of the cavity is smaller than the width 32w of the wall and the thickness 33t of the cavity is smaller than the thickness 32t of the wall. Walls 32b and 32d are identical, whereas wall 32c is longer. Preferably, the length of the cavity is adjusted to the length of the wall.

The cavities 14 and 34 are carved in the walls such that the edges of the cavity are located at a certain distance "d" from the edges of the wall. Preferably, the distance "d" corresponds to the distance at which the inserts are located relatively to the edges of the lower and upper part of the walls.

The walls present similar characteristics in regards of width and thickness.

Referring back to FIG. 1, the third part of the storage device corresponds to the top part 30 of the device. The top part 30 is constructed similarly to the bottom base. However, the top tray 31 has a cutout for allowing access to the storage container when assembled. Furthermore, the upper part is absent a front wall thereacross at a front edge of the container (when assembled). Therefore, only three walls 32b, 32c and 32d support the upper part when assembled. The upper part is preferably a molded part wherein the mold comprises the cutout upper surface and the three surrounding walls for mating with the sidewalls of the storage device when assembled.

Referring back to FIG. 1, the second part of the storage device corresponds to the sidewall part 20. The sidewalls are formed from an extracted rigid double paneled plastic material, for example high-density polyethylene having an outer sheet $S_o$, an inner sheet $S_i$ and an integral web W connecting the two sheets, the webs of all the sidewalls being vertical in the normal orientation of the liner box. The sidewall part comprises a series a three connected panels 22b, 22c and 22d. The panel 22b is connected to panel 22c through a flexible hinge and panel 22c is connected to panel 22d through a flexible hinge. Each panel 22b, 22c and 22d has a substantial thickness that separates an outer surface $22b_o$, $22c_o$ and $22d_o$ from an inner surface $22b_i$, $22c_i$ and $22d_i$.

The panels have an upper longitudinal cross section approximately rectangular from which a part 24b, 24c and 24d are protruding, respectively. Similarly, the panels have a lower longitudinal cross section approximately rectangular from which a part 23b, 23c and 23d having a substantial parallelepiped shape protrude, respectively. Of course, the longitudinal cross sections mentioned are in an upper or lower location only when the panels are in an upright or an approximately upright position.

The approximately rectangular longitudinal cross sections of the panels have similar dimensions to the dimensions of the walls 12b, 12c and 12d of the bottom part. Further, the dimension of panels 22b and 22d are also similar. The margins correspond to inserts that are inserted into the cavities of the walls from the bottom part 10. The length, width and thickness of the margins are such that the protrusion 23b protruding from the lower part of panel 22b precisely engages the cavity 14b, the protrusion 23c protruding from the lower part of panel 22c precisely engages the cavity 14c and the protrusion 23d protruding from the lower part of panel 22d precisely engages the cavity 14d. The length, width and thickness of the margins protruding from the upper part of the panels are identical to that of the margins from the lower part.

The approximately rectangular longitudinal cross sections of the upper parts of the panels have similar dimensions to the dimensions of the walls 32b, 32c and 32d of the upper part. The margins correspond to inserts that are inserted into the cavities of the walls from the top part 30. The length, width and thickness of the margins are such that the protrusion 24b protruding from the upper part of panel 22b precisely engages the cavity 34b, the protrusion 24c protruding from the upper part of panel 22c precisely engages the cavity 34c and the protrusion 24d protruding from the upper part of panel 22d precisely engages the cavity 34d.

Figure 3A:
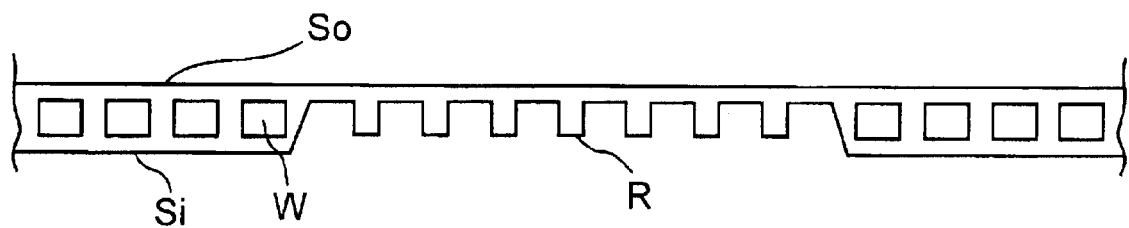
FIGS. 3a, 3b, 3c and 3d are simplified diagrams of the structure of the panels and the flexible hinge portion between two adjacent panels.
Figure 3B:
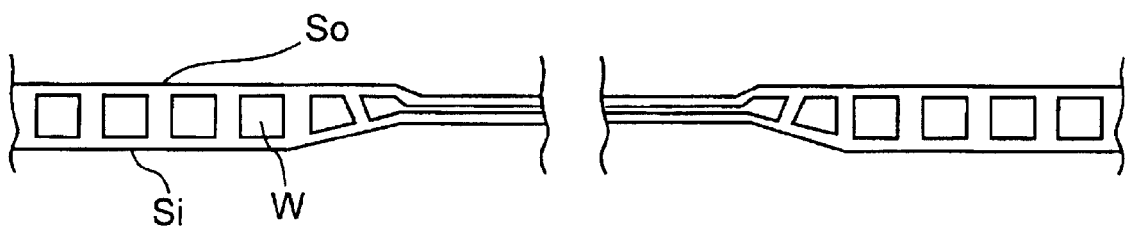
Figure 3C:
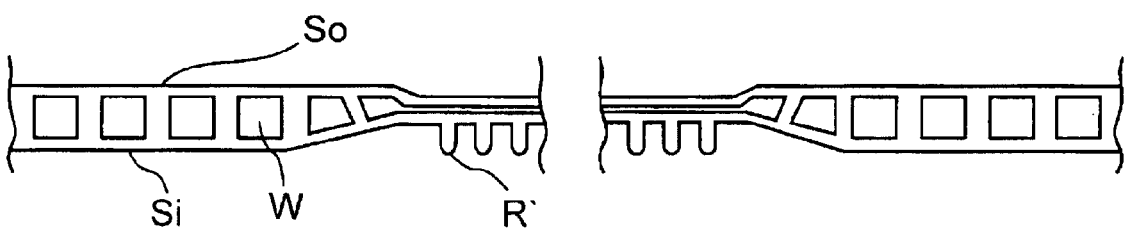

Referring to FIGS. 3a, 3b and 3c, simplified diagrams of the structure of the panels and the connection between two adjacent panels are shown. The hinge portion is different on each figure reflecting three alternative embodiments of producing flexible hinge portions. The panels are each formed of double walled plastic material, as for example high density polyethylene, having an outer sheet So, an inner sheet Si, and an integral web W connecting the two sheets, the webs of all the panels being vertical when the box is assembled.

The flexible hinge portions are narrow, and formed from a continuation of the outer sheet So which extends across a gap between edges of adjacent inner sheets Si of the panels. These continuations of the outer sheet preferably have vertical ribs R projecting from their inner surfaces, corresponding to webs W. It will be apparent that a sidewall portion is formed from a single piece of the double walled plastic material by removing the inner sheet from the panel areas intended to form hinge sections as pictured in FIG. 3a. Alternatively, the double walled plastic material can be heated, pressed and collapsed to form a hinge section as shown in FIG. 3b. In yet an alternative embodiment, ribs can be formed into the heated collapsed material so that ribs are formed on the inner wall that allow hinging of the corner sections while providing additional strength of the heated collapsed hinged portions as shown in FIG. 3c.

Figure 3D:
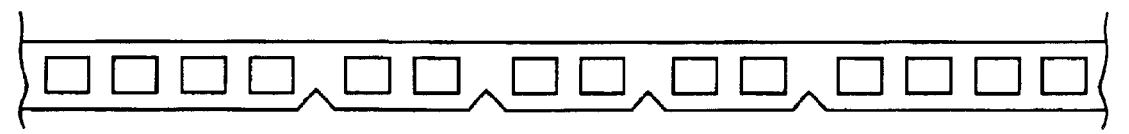

Of course, the inner and outer sheets are arbitrary names and the outer sheet material is removed to form the embodiment of FIG. 3a. Alternatively, grooves are cut into the material through one of the inner and outer sheets to produce notches extending along the height of the sheets in order to allow for bending of the sheets at the notches, as shown in FIG. 3d. This allows for additional strength in the flexible hinge portions but may affect the minimum radius of curvature of the hinge portions.

Figure 4:
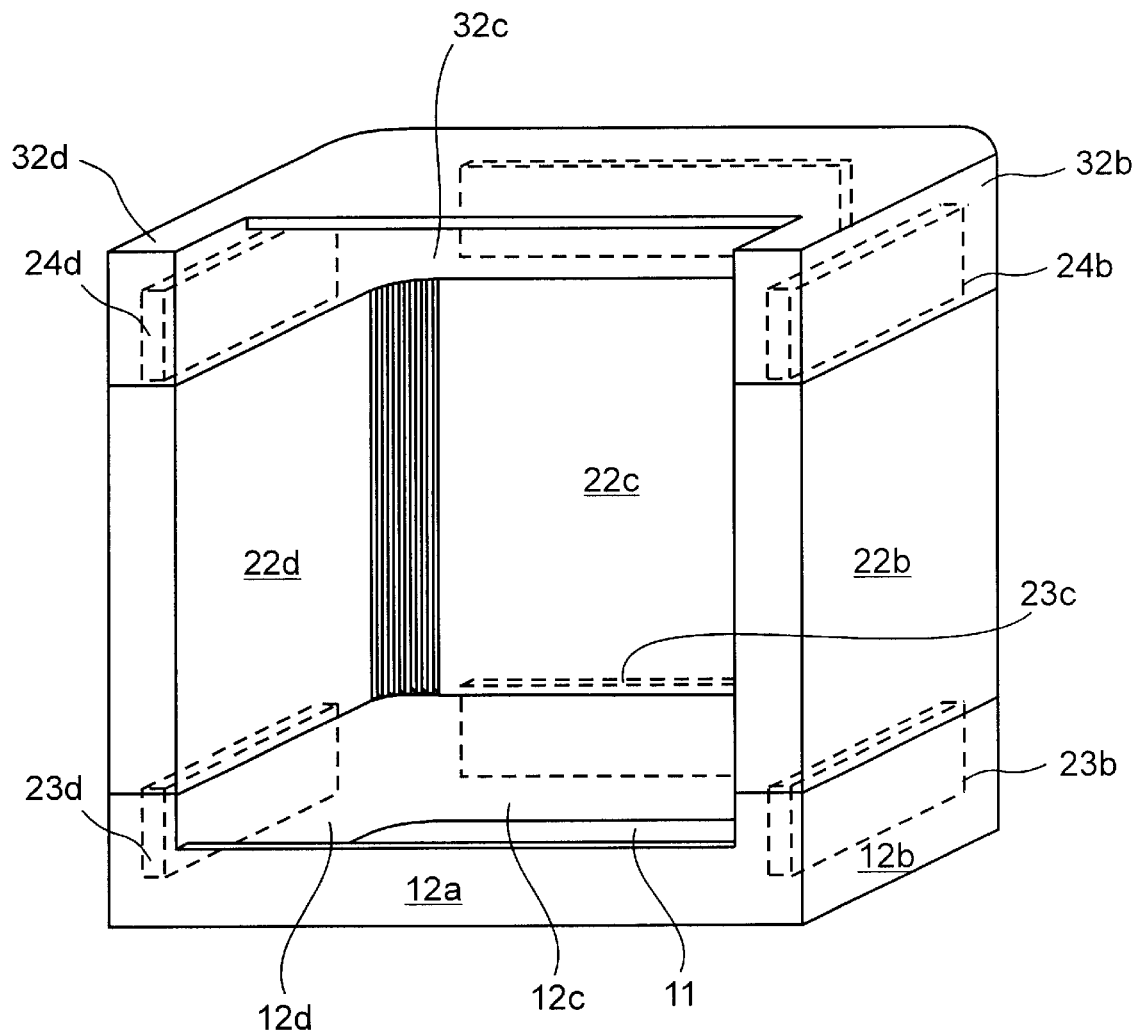
FIG. 4 is a simplified perspective view of the storage device of FIG. 1 in an assembled mode.

Referring to FIG. 4, the storage device of FIG. 1 is shown in an assembled mode. The margins protruding from the lower part of the panels are inserted in the cavities of the walls of the bottom base; the margins from the upper part of the panels are inserted in the cavities of the walls of the top part of the storage device. When assembled, the device has a general shape of a box having an opening for providing an access to the inside of the box. For sake of clarity, the similar main features are labeled as they were in FIG. 1.

Figure 5A:
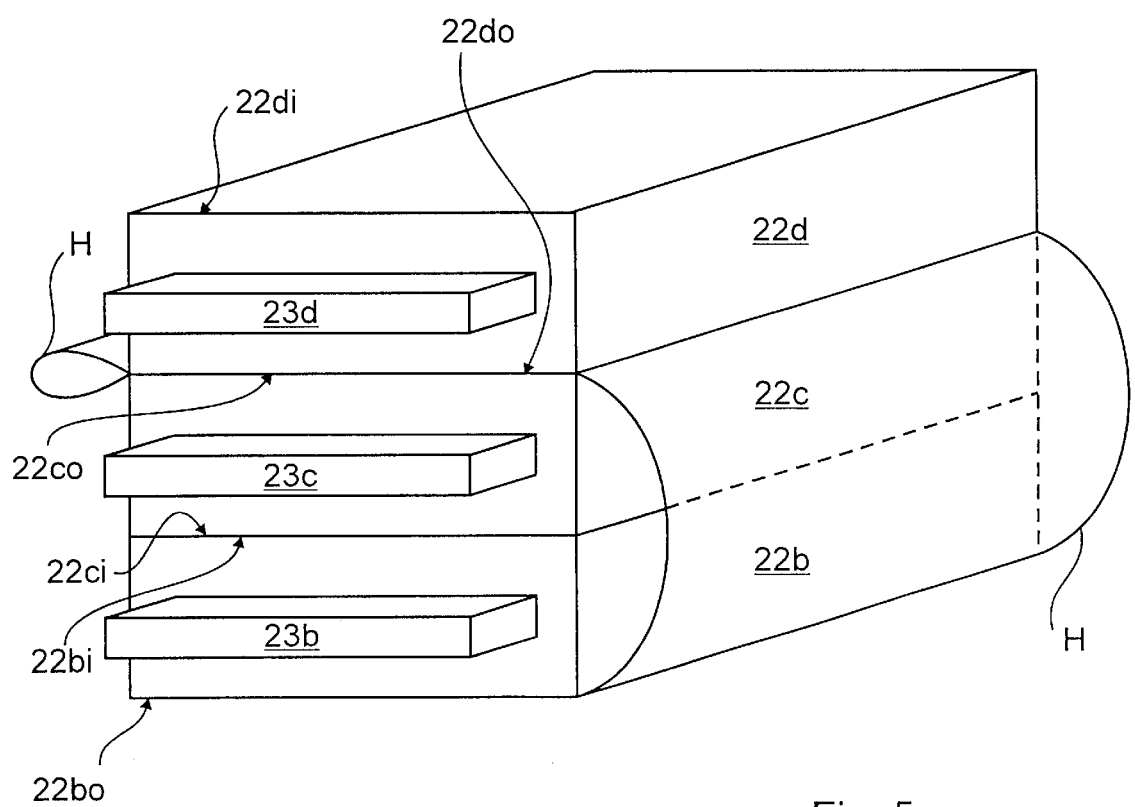
FIG. 5a is a simplified diagram of the walls in a disassembled mode.

Referring to FIG. 5a, a simplified diagram of the panels in a disassembled mode is shown according to an embodiment. In such a disassembled mode, the hinge sections H allow for folding of panels 22b, 22c and 22d one on top of each other. The flexibility of the formed hinge sections allows the sections to form rounded 90° angles, corresponding to the curvature of the corners of the bottom base 10 and top part 30, when the box is assembled. The radii of the corners, the material of the panels, and the thickness of the panels are chosen to ensure that minimal damage occurs when the sidewall part 20 is folded. The hinge sections H are suitable for flexing from the 90° included angle condition of the erected condition, down to 180° in the disassembled condition. Therefore, when disassembled, the panels forming the sidewall are foldable along each flexible hinge H, such that the panels are stackable on top of each other. The thickness of the stacked panels corresponds to the sum of each panel's width.

The disassembled panels shown in FIG. 5a correspond to the model of connection as shown in FIG. 1, where panels 22b, 22c and 22d are attached one to the other through a continuation of their outer sheet to form the flexible hinge between two adjoining panels.

In a model where the panels 22b, 22c and 22d are attached one to the other through a continuation of their inner sheet forming two flexible hinges, the stacked panels are identical as to that shown in FIG. 5a when in the disassembled mode.

Figure 5B:
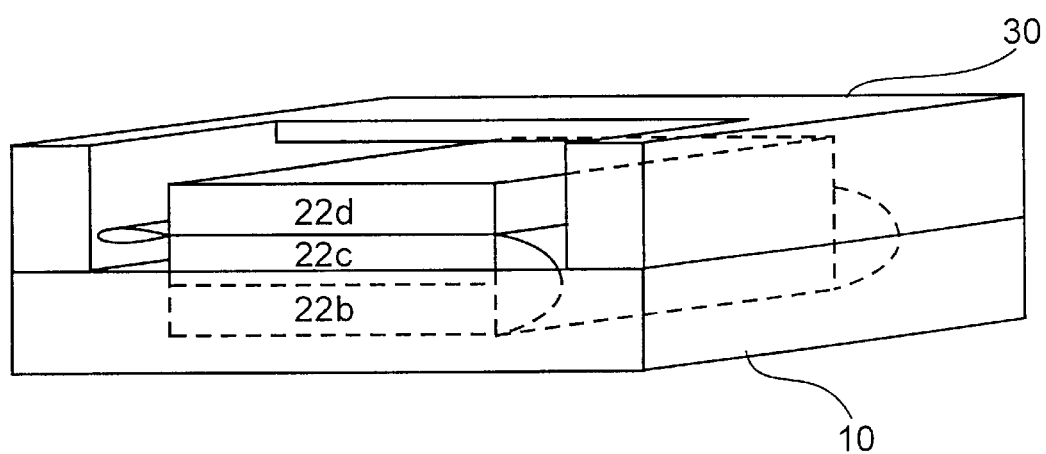
FIG. 5b is a simplified diagram of the bent sidewalls that fit entirely between the top plate and the bottom base in a disassembled mode.

In the disassembled mode, for practical purpose like conservation of space, the flexible hinges H and panels 22b, 22c and 22d fit entirely between the bottom base 10 and top part 30 when they are mated together, as shown in FIG. 5b.

Advantageously, the costs associated with manufacturing of the box liner, as shown in FIG. 1, are minimal because the bottom part 10 and the top part 30 are similarly designed. When the bottom part 30 is manufactured, a duplicate is made thereof to form the top part 10, with portion cut out to form the opening in the top part.

Figure 6:
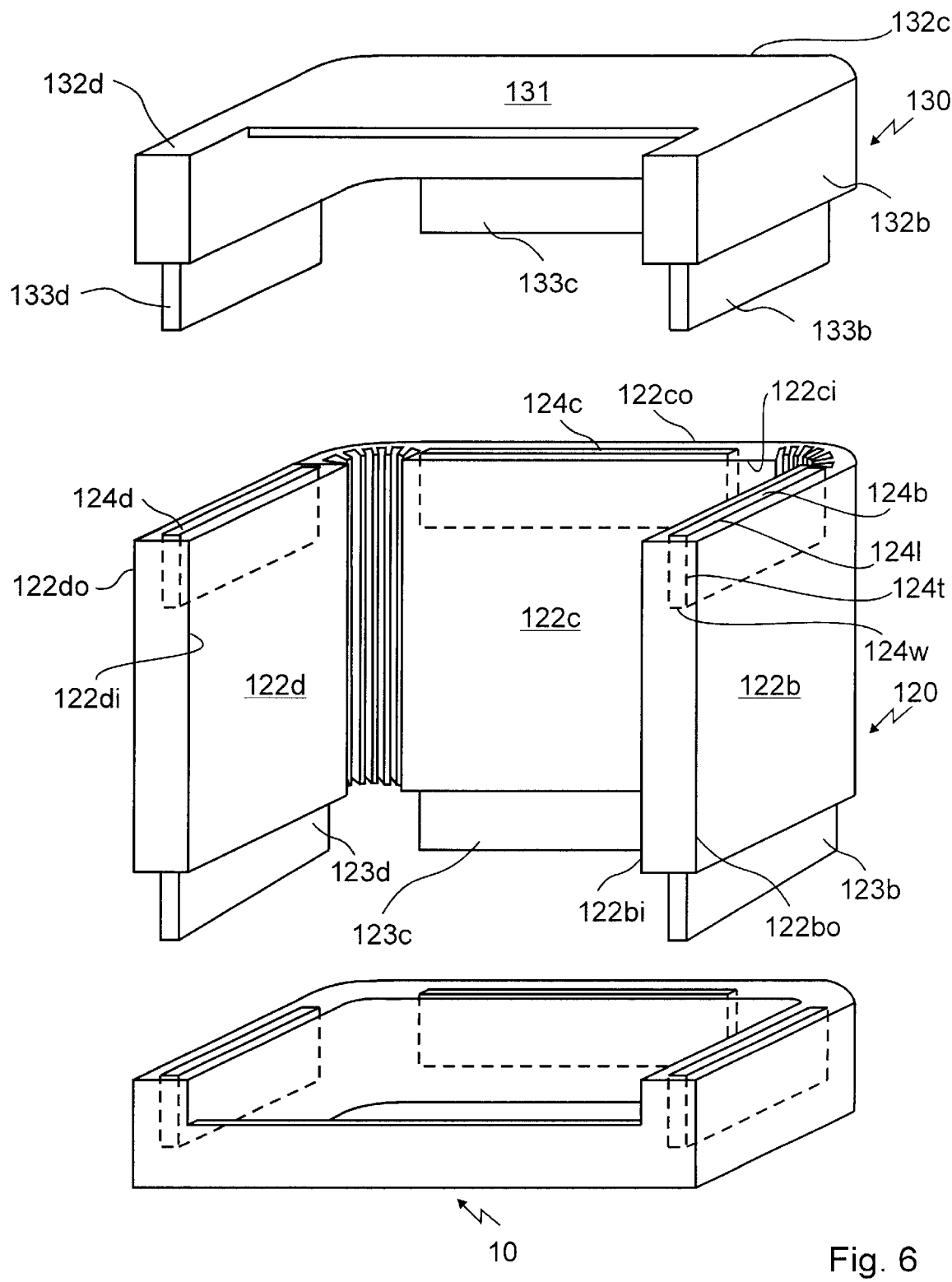
FIG. 6 is an exploded perspective view of a storage device according to another preferred embodiment.

Referring to FIG. 6, a perspective view of a storage device according to another embodiment is shown. The storage device, in the form of an opened box, comprises a bottom base 10, a sidewall part 120 and a top part 130. The bottom base in this other embodiment is similar to the bottom base already described in FIG. 1.

The sidewall part 120 comprises a plurality of panels 122b, 122c and 122d. The sidewalls are molded of rigid double paneled plastic material, for example high-density polyethylene having an outer sheet SO, an inner sheet S1 and an integral web W connecting the two sheets, with the webs of all the sidewalls being vertical in the normal orientation of the liner box. The sidewall part 120 comprises a series a three connected panels 122b, 122c and 122d. The panel 122b is connected to panel 122c through a flexible hinge and panel 122c is connected to panel 122d through another flexible hinge. Each panel 122b, 122c and 122d has a substantial thickness that separates an outer surface $122b_o$, $122c_o$ and $122d_o$ from an inner surface $122b_i$, $122c_i$ and $122d_i$.

The panels 122b, 122c and 122d have a lower longitudinal cross section having an approximately rectangular shape from which parts 123b, 123c and 123d having a substantial parallelepiped shape, respectively protrude. The panels 122b, 122c and 122d have a flange located along the longitudinal cross section of the upper part thereof, with the flange having similar characteristics to that of the upstanding flange surrounding the bottom base 10. Of course, the longitudinal cross sections mentioned are in an upper or lower location only when the panels are in an upright or an approximately upright position.

The approximately rectangular longitudinal cross sections of the panels have similar dimensions to the dimensions of the walls 12b, 12c and 12d of the bottom part 10. Furthermore, the dimension of panels 122b and 122d are also similar to each other. Each of the panels 122b, 122c and 122d has protrusions 123b, 123c, and 123d, respectively that correspond to apertures within the formed in the walls of the bottom part 10. The length, width and thickness of the protrusions are such that protrusion 123b protruding from the lower part of panel 122b precisely engages cavity 14b, protrusion 123c protruding from the lower part of panel 122c precisely engages cavity 14c and protrusion 123d protruding from the lower part of panel 122d precisely engages cavity 14d.

The panels features a slot having an approximately rectangular shape on the upper longitudinal cross section thereof forming cavities 124b, 124c and 124d. The cavities have an approximately parallelepiped shape and are parallel to sides of the panels. The cavities are delineated with walls formed by the interior of the panels having a length 124l, a width 124w and a thickness 124t. Of course, each dimension of a cavity is smaller than a corresponding dimension of a panel in which it resides.

The top part 130 of the box comprises a top tray 131 truncated for providing an easy access to the inside of the box when it is assembled. To this end, the upper part 131 is missing a front wall. Therefore, only three walls 132b, 132c and 132d surround the open-upper part 131. The upper part 131 is preferably a molded part wherein the mold comprises the truncated upper surface and the three surrounding walls. Each wall has a lower longitudinal cross section approximately rectangular in shape from which a protrusion 133b, 133c and 133d having a substantial parallelepiped shape is formed, protruding from walls 132b, 132c and 132d, respectively.

During box assembly, protrusions 133b, 133c and 133d are engaged into the cavities 124b, 124c, and 124d located on the upper part of the panels 122b, 122c and 122d, respectively. The dimensions of the protrusions 133b, 133c and 133d, i.e. length, width and thickness, are compatible with the corresponding dimensions of the cavities 124b, 124c, and 124d formed on the upper part of the panels. The length, width and thickness of the protrusions are such that protrusion 133b protruding from wall 132b precisely engages cavity 124b, protrusion 133c protruding from wall 132c precisely engages cavity 124c, and protrusion 133d protruding from wall 132d precisely engages cavity 124d.

Figure 7:
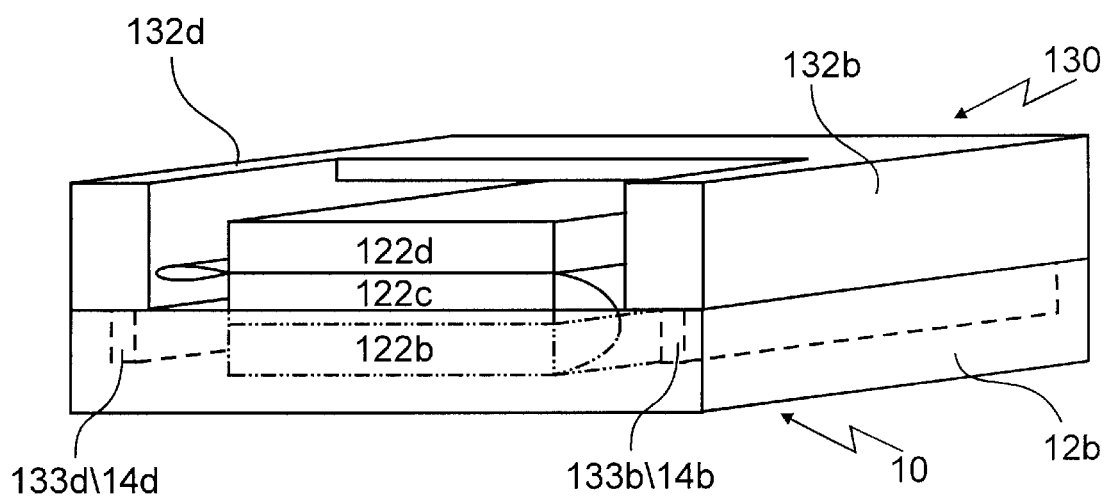
FIG. 7 is a simplified perspective view of the storage device as described in the embodiment of FIG. 6 in the disassembled mode.

The material used to manufacture the storage device as described in the embodiment of FIG. 6 is similar to the material used for manufacturing of the storage device as described in the embodiment of FIG. 1. Therefore, when disassembled, the panels forming the sidewall are foldable along the flexible hinges such that the panels are stackable one on top of another. FIG. 7 shows the storage device as described in the embodiment of FIG. 6 in the disassembled mode. In this mode, the bent sidewall fits entirely between the top part 130 and the bottom tray 10 thus advantageously conserving space, while preventing unintentional separation of the top part 130 from the bottom tray 10. In this collapsed condition, the protrusions 133b, 133c and 133d formed on the top part 130 engage cavities located in the walls of the bottom tray 10. Thus, when disassembled, the bent sidewall is entirely enclosed by the top part 130 and the bottom tray 10. Advantageously, the collapsed enclosure does not comprise a top that is just in contact with the bottom part, but the two parts are engaged through their respective protrusions and cavities.

Figure 8:
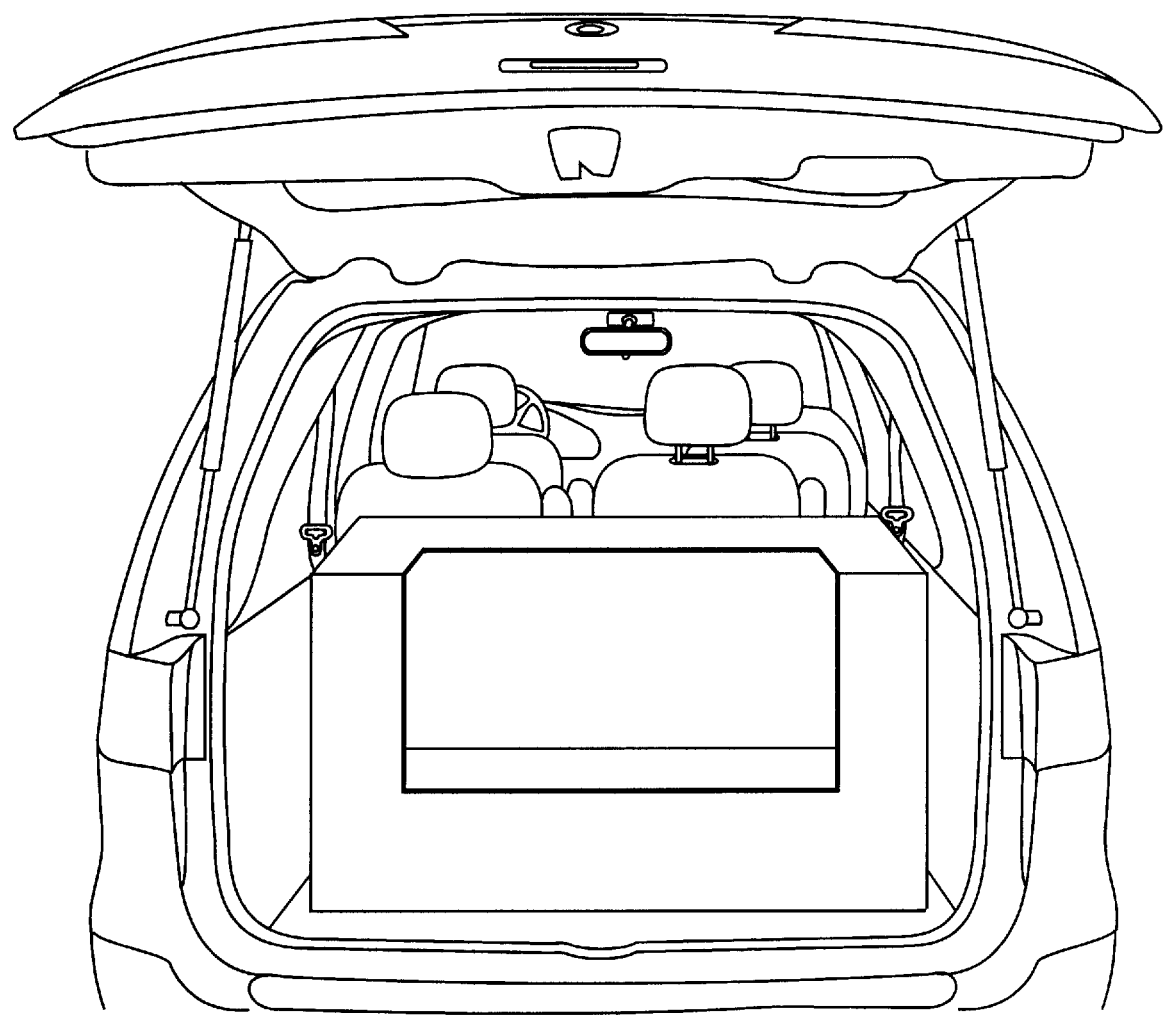
FIG. 8 is a view of the mini van box liner in the assembled mode when in place inside a mini van trunk.

In FIG. 8, the storage device, in the form of a box liner is shown placed in the rear area of a mini van. The rear seat of the van is removed leaving the middle seat in place. The box fits in the space liberated by the removal of the rear seat. Advantageously, the bottom tray comprises the lip all around for containing any spills whether they are paint, water, or even lime, or other acid base corrosives. Advantageously, the interior box or container is designed to hold the maximum amount of tools and supplies safely within the box thereby protecting the valued trunk interior. The corrugated plastic panels are made of a strong interlocking construction that absorb great amounts of impact and vibrations, thus assuring the owner that their vehicle interior is safe from potential damage.

Preferably, the material used to manufacture the container is a lightweight material; for example, a 60 cm high box liner wherein the trays are 120 cm×120 cm weighing about 16 kg.

Further alternatively, the liner box is reversible upside down in order to protect fragile objects. In such conditions, the molded base becomes the top of the box and functions as a shelf for example and the inside of the box is a protected area. In such condition, items purchased at a grocery store, fruits, vegetable and eggs for example, can be stored inside the box, whereas drinks are stored on the top thereof, in the molded base.

Figures 9A, 9B:
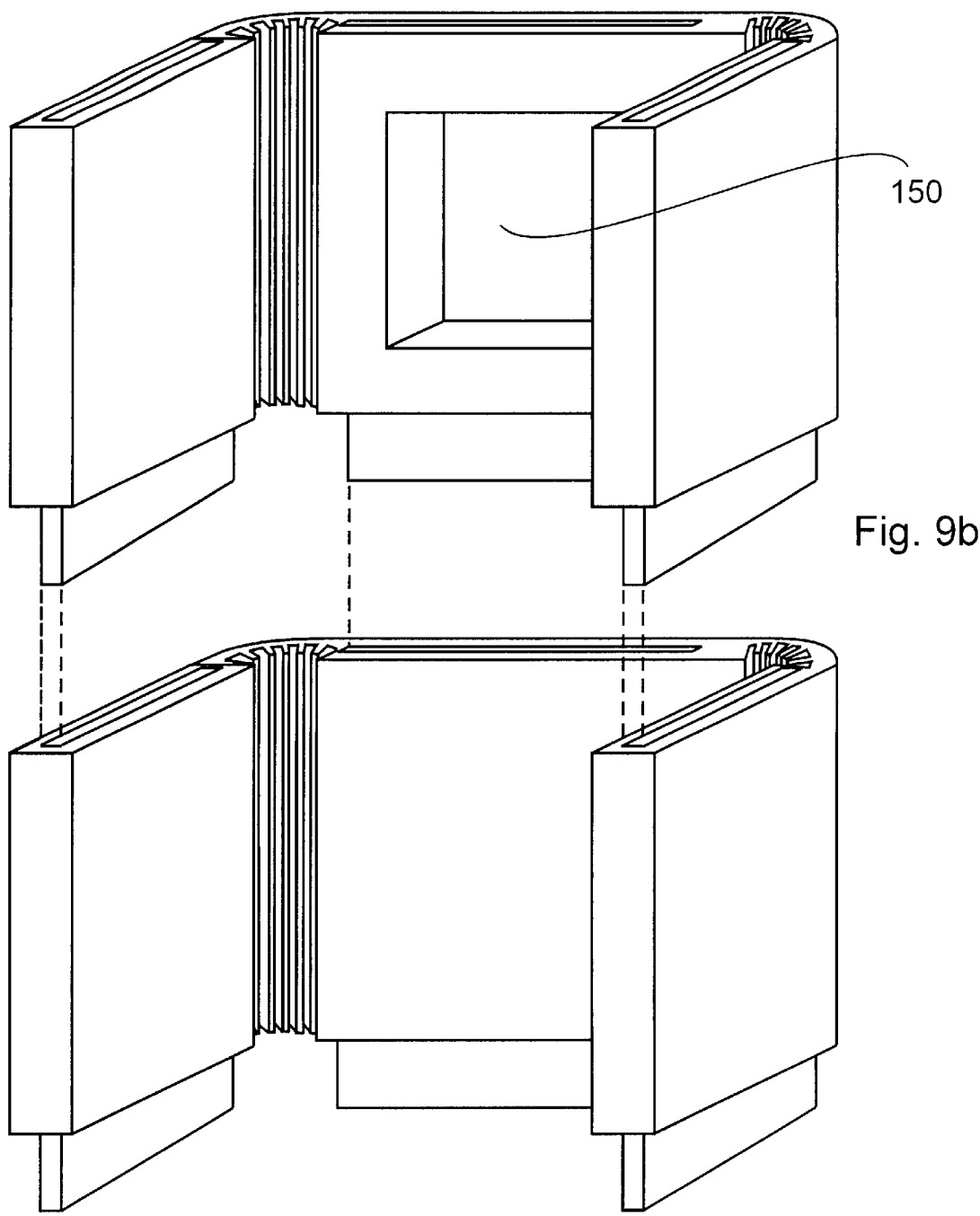
FIG. 9a is a perspective view of a sidewall extension part according to another preferred embodiment.
FIG. 9b is a perspective view of a sidewall extension part according to another preferred embodiment.

Optionally, the liner box as described in embodiment of FIG. 6, is extendable. A second sidewall part identical in term of dimensions, to the described sidewall is added such that the protrusions located at the lower part of the second sidewall engage the cavities of the upper part of the first sidewall. Preferably, the second sidewall has cavities on its upper part to engage the corresponding protrusions of the top part for assembling the extended box. FIG. 9a shows a perspective view of the sidewall extension part according to another preferred embodiment. The sidewall extension is of the type where each of the panels constituting the sidewall is a plain panel. Extending the height of the box liner allows for securely storing more material in the trunk of the vehicle. Unfortunately, the extension potentially obtrudes the sight through the back window, which is not recommended for the safety on road and safety of people. Optionally, as shown in FIG. 9b, the sidewall extension comprises a panel 150 having a cut out for inserting an insert panel of a transparent material as for example a clear plastic or transparent Plexiglas®. The panel 150 corresponds to the back panel of the box when assembled. Advantageously, an insert with transparent material allows the driver of the van to still be able to use the rear view mirror.

Optionally, the outside part of the bottom base closure is equipped with wheels to facilitate the displacement of the box when it is, for example, loaded with working equipment. Therefore, it is easier to switch from a van used for work, to a van used for family transportation. On its wheels, the box is easily moved without being unloaded towards a storage space, to reinstall the rear seat of the van, or to put a further mini van box for packing the trunk with luggage. Of course, when the box is formed of suitable material, it slides freely without damaging the minivan or the tools inside.

Figure 10:
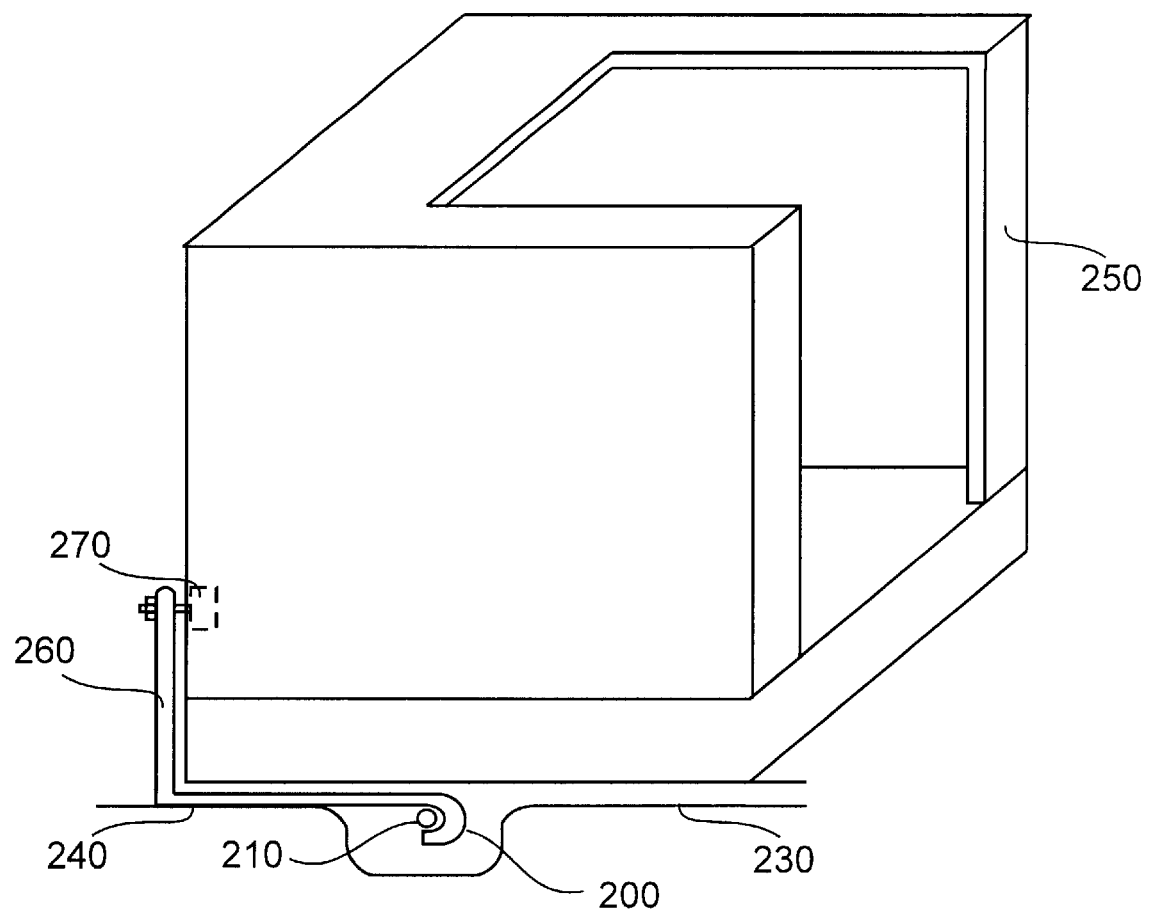
FIG. 10 is a simplified diagram of a safety device securing the box in the rear of a minivan.

Further optionally, the back panel of the box is attached to a safety device for preventing the box to slide in case of emergency situation. The rear seat of the van is removed for installing the box liner in the cargo area of the vehicle, and then the rear seat attachment is usable for other use. Referring to FIG. 10, a simplified diagram of a safety device securing the box in a vehicle trunk is shown. The safety device is in the form, for example, of a clip 200, for engaging the rear seat attachment system 210. The rear seat attachment system 210 is embedded in a slot 220 of the floor 230 of the vehicle. The clip is attached to an extended arm 240 for supporting the box 250 when installed in the trunk. The arm 240 is attached to a further arm 260, the two arms forming an angle of approximately 90°; the arm 260 is for preventing the box to slide in direction of the passengers' seat. Preferably, the arm 240 has a length sufficient for limiting rotating movement of the box relatively to the rear seat attachment 210. Optionally, the arm 260 comprises a hole adjacent a hole on the back panel of the box 250 such that a screw 270 further secures the box to the arm.

Figure 11A:
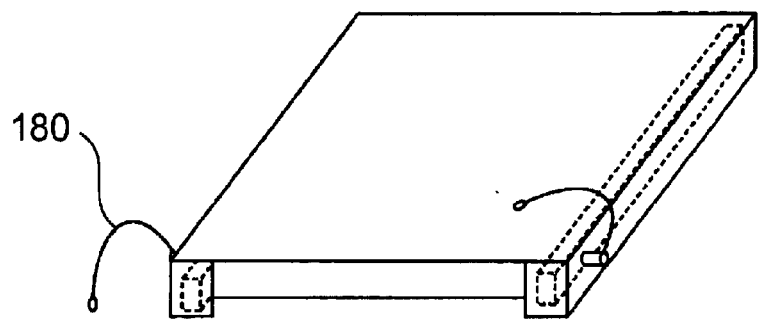
FIGS. 11a–b are perspective views of the top plate absent a cutout.
Figure 11B:
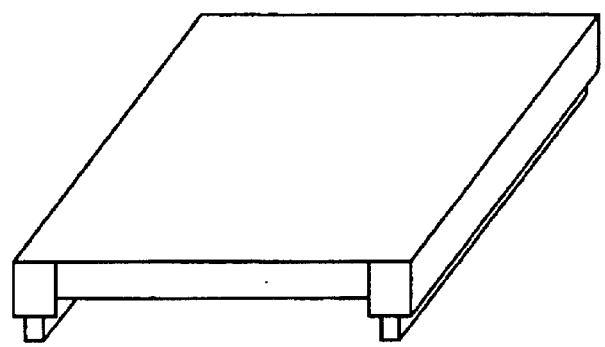

Various options exist regarding the shape of the top plate as well as the continuous sidewall to allow access to the enclosure delineated by the box liner. FIGS. 11a–b show perspective views of the top plate absent a cutout. In FIG. 11a, the top tray comprises attachment systems in the form of flexible bonds 180 wherein one extremity is attached to teh top tray of the box and the second opposite extremity is for engaging a connection means on the rear door of the vehicle such that when the rear door is open, the top tray opens.

Figure 12A:
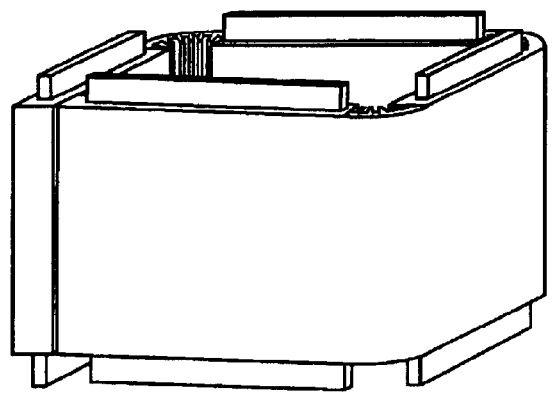
FIGS. 12a–b are perspective views of the sidewall part comprising four panels and three hinge portions.
Figure 12B:
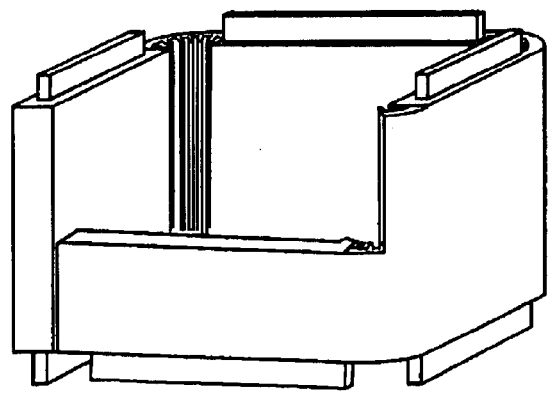

FIG. 12a–b show perspective views of the sidewall part comprising four panels and three hinge portions. Any combination of a top plate having a cutout or absent a cutout, a continuous sidewall comprising three panels or four panels wherein eventually one panel comprises a cutout, is possible. The access of the enclosure depends on the location of the cut out.

Figure 13:
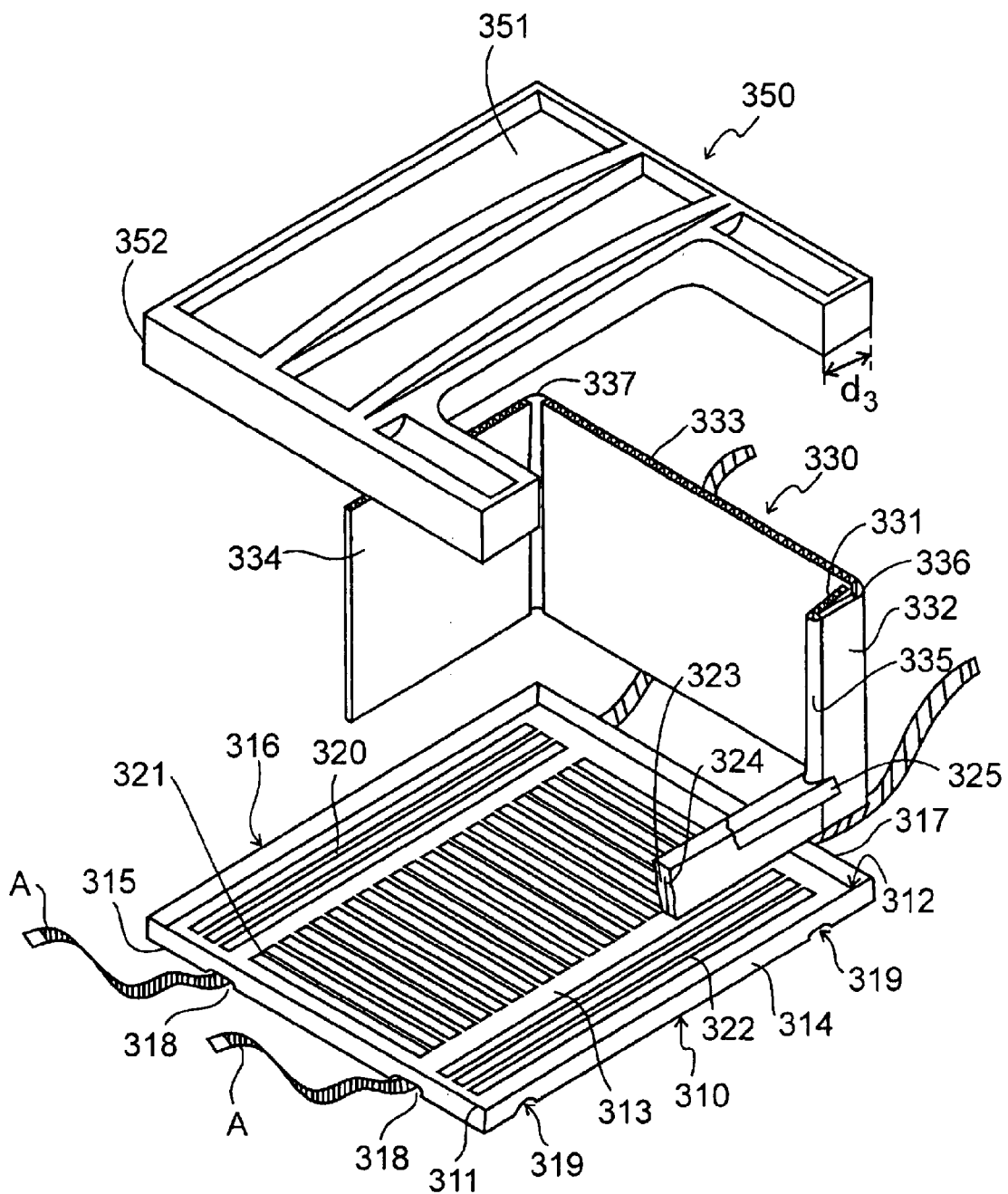
FIG. 13 is an exploded perspective view of a storage device according to yet another preferred embodiment.

Referring to FIG. 13, an exploded perspective view of a minivan box liner according to yet another preferred embodiment is shown. The box liner comprises a molded bottom tray 310, a sidewall part 330 and a molded top tray 350.

The bottom tray 310 comprises a bottom plate 313 of an approximately rectangular shape surrounded by a continuous bottom lip 311. The bottom plate 313 also has channels 320, 321 and 322 formed integrally therein for added rigidity. Advantageously, the channels permits the stored material to be maintained a substantial distance away from spillage when it occurs. The bottom lip 311 comprises an outside groove 312 for engaging the lower edge of the panels constituting the sidewall part 330. Advantageously, the bottom lip reinforces the rigidity of the bottom plate by increasing the resistance to potential twist of the bottom plate.

The bottom tray comprises four edges, a front edge 314, a left edge 315, a back edge 316 and a right edge 317. The left and right edges comprise recesses 318 located on the bottom surface of the bottom tray. The recesses 318 are for engaging adjustable straps "A" that are used for tightening the assembly in place in the assembled mode. Optionally, the adjustable straps "A" are also used for maintaining the part together when the box liner is disassembled. The front edge 314 comprises recesses 319 of a dimension sufficient for accommodating hands for allowing a user to grab the bottom tray and pull the box liner out of the rear area of a vehicle without unloading the material stored within the container.

Optionally, the front edge 314 of the bottom tray also comprises a recess for engaging another adjustable strap for tightening the assembly in place in the assembled mode. Preferably, the adjustable straps are also used for maintaining the various part together when the box is disassembled and the sidewalls are folded and stored between the bottom and top tray. In such circumstances, the straps are adjusted to a new length for tightening the collapsed box.

The sidewall part 330 is formed with two identical parts, which when the box liner is assembled provide a wall on the right side, the left side and the backside of the box. The front side of the box is partially obtruded with panels of smaller dimension to provide an opening and an access within the enclosure delineated by the sidewall part.

For sake of clarity, only one of the two identical parts of the sidewall part 330 is shown in FIG. 13. The shown portion comprises four panels 331, 332, 333 and 334 and three flexible hinge portions 335, 336 and 337 connecting each panel to another panel. Each panel is attached to another panel via a flexible hinge portion. Therefore, panel 331 is attached to panel 332 through the hinge portion 335. Similarly, panel 332 is attached to panel 333 through the hinge portion 336. Similarly, panel 333 is attached to panel 334 through the hinge portion 337. The other portion of the two identical parts of the sidewall part 330 joins the first portion on the back side of the box by connecting opposite ends of the panels, for example using a joint in which the outer sheet So of one end of the panels overlaps with and is attached to inner parts of the other end of the part. In order to reinforce the box when assembled, the size of the groove is sufficiently wide for engaging only one lower panel edge. Therefore, at the joint, the two identical parts are biased against each other limiting possible inward bending and movement of the wall panels.

In the assembled mode, the panels 331 and 332, of similar dimension, are folded about the hinge portion 335. When folded and their lower panel edges engage within the bottom groove 312, the panels partially enclose the front side of the box. Optionally, two folded panels 323 and 324, forming a tongue, disposed along the front edge 314 of the bottom tray further limit the opening on the front side. The folded panels 323 and 324 are disposed horizontally relatively to the upright panels of the sidewall parts when assembled.

The folded panels 323 and 324 are attached to the adjacent upright panels using the tightening piece 325, which overlaps the folded panels 323 and 324 at the flexible hinge portion attaching the two panels. The tightening piece comprises arms that extend from the two opposite ends, the arms for overlapping with the upright panels 331 and 332.

The molded top tray 350 comprises a top plate 351 surrounded by top lip 352. The top lip 352 comprises a groove (not shown) for engaging the upper panel edge of the sidewall 330 when assembled. The molded top tray 350 has a cutout for allowing access to the minivan box liner when assembled. The distance $d_3$ between the edge of the cutout and the outside edge of the top tray corresponds to the length of the upper panel edge of panels 331 and 332. Furthermore, the top part is absent a front wall thereacross at a front edge of the box liner, when assembled.

Of course, the panel edges mentioned are in upper and lower locations only when the panels are in an upright or an approximately upright position.

As shown in FIG. 13, the top plate 351 of the box liner is molded such that various shaped compartments are delineated for containing various objects directly accessible from the middle seat of the van. During a long trip, the toys of a child are stored thereon and not thrown among luggage where they are difficult to reach when the child needs them, for example. The formed top, or lid, is designed to maintain material within the box while allowing easy access to the box interior.

Figure 14:
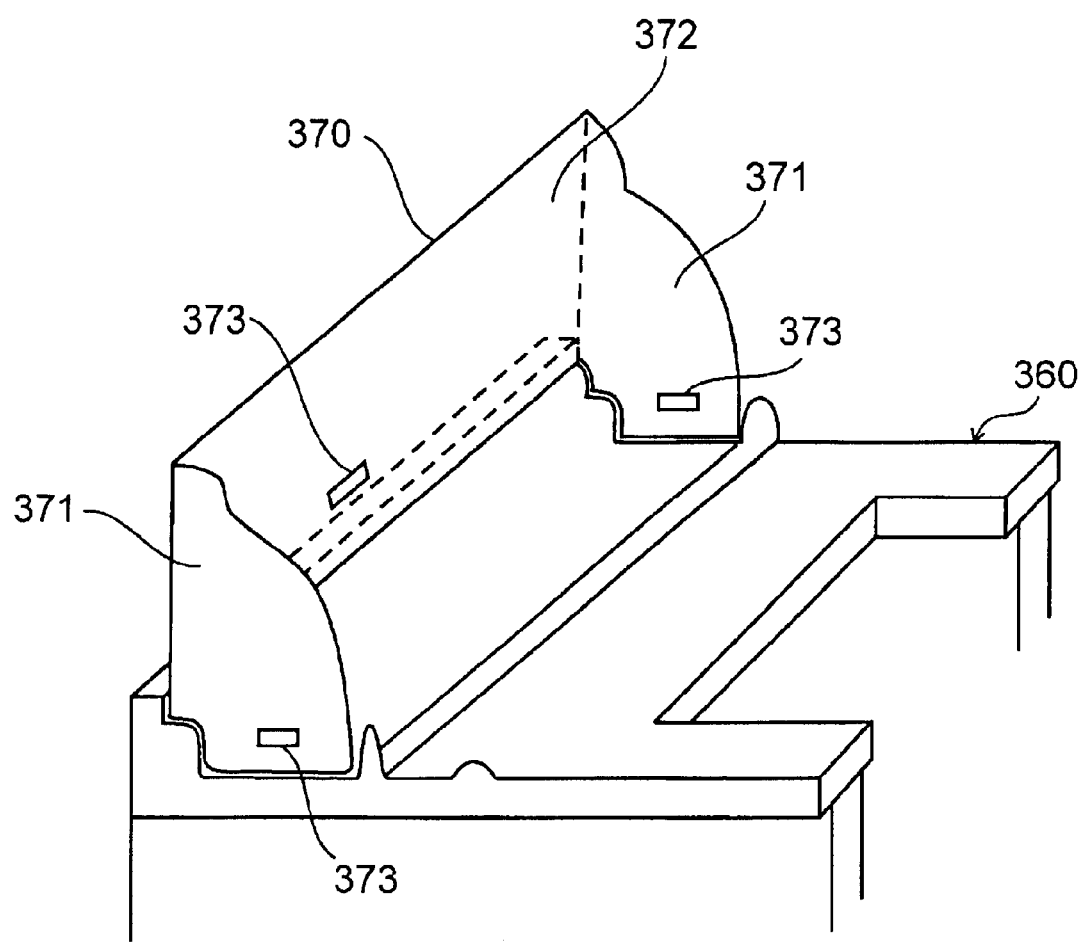
FIG. 14 is a perspective view of a removable and bendable clear shield according to another preferred embodiment.

Referring now to FIG. 14, a perspective view of a removable and bendable clear shield according to another preferred embodiment is shown. In order to prevent objects from injuring and striking passengers or driver in emergency situation as a sudden stop, a clear shield is positioned on top of the box. Typically, a bulkhead in a cargo van or vehicle of the like, that allows items to travel a great distance in a sudden stop situation, is required to be constructed metal or high impact plastic and connected to the vehicle metal to metal. An object traveling from the rear of the vehicle to as much as fourteen feet to the front of the vehicle gathers momentum, speed and force as it travels. In a minivan for example, the travel distance of an object in the tray is about 8 feet, which is a distance sufficient to cause damage and injury. The clear shield of FIG. 14 is adequate to restrain an object that has only a couple of feet at the most to travel from the bottom tray to the shield. Preferably, the shield is made of a clear transparent material to allow the driver to keep using the rear window for a safe driving. The removable clear shield 370 is a bendable shield, which is bent to show two lateral small sides 371 spaced apart by a long side 372 for allowing the assembly of the shield on the box. The shield is positioned on top of a top tray 360, the long side 372 of the shield coinciding with the backside of the top tray. When bent, the shield is biased inside a shaped compartment of the top tray. The each side of the shield comprises a perforation 373 for engaging a C-shaped clip located at the two opposite extremities of the adjustable straps described in FIG. 16.

Figure 15A:
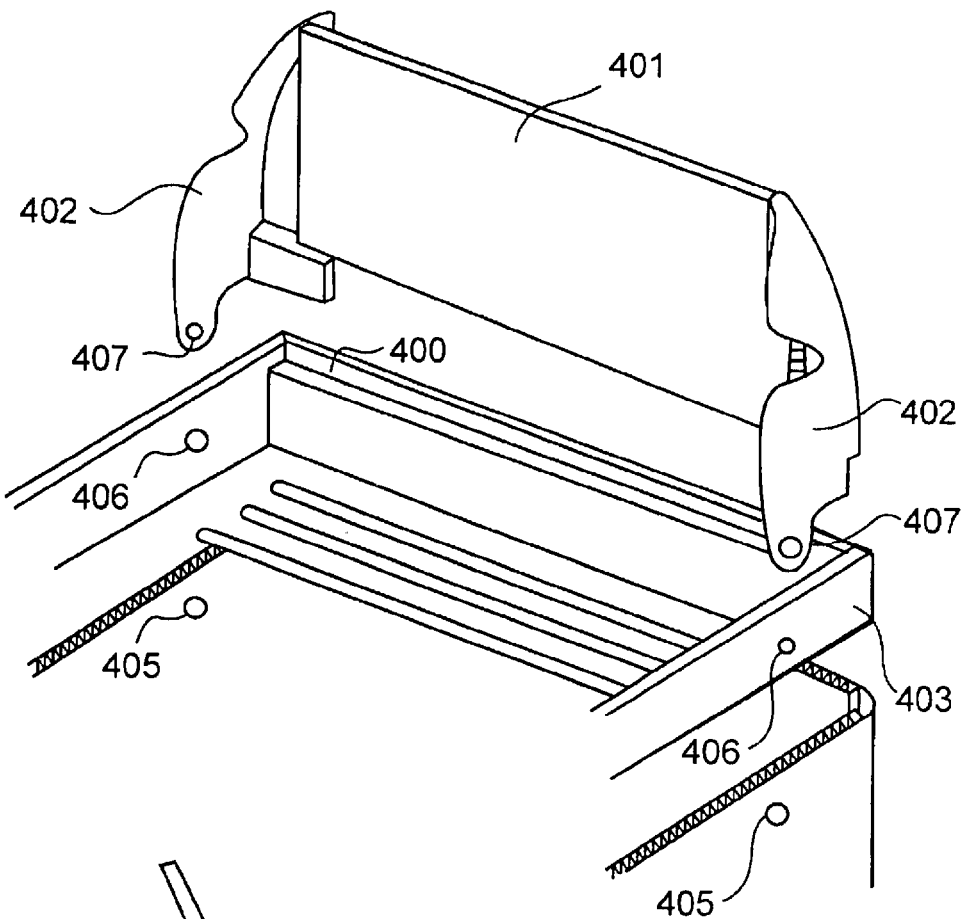
FIG. 15a is an exploded view of a retractable shield according to another preferred embodiment of the present invention.

Referring to FIG. 15a a view of a retractable shield according to another preferred embodiment of the present invention is shown. In order to strengthen the bulkhead, an extra lip 400 in the top tray on the backside of the box such that the long and wall 401 of the shield sits securely in the formed lip 400. The long wall is attached to two lateral walls 402 positioned at two opposite ends of the long side. The lateral walls are hingedly connected to the top lip 403 of the top tray. The hinge allows rotation of the shield from an upright position to a retracted position. The hinge is in the form for example of a rotating means comprising a bolt passing through a drilled hole. A perforation 405 is made through the right and the left panels of the box; another perforation 406 is made through the top lip of the top tray and a further perforation 407 is made through the lateral walls of the shield.

Figure 15B:
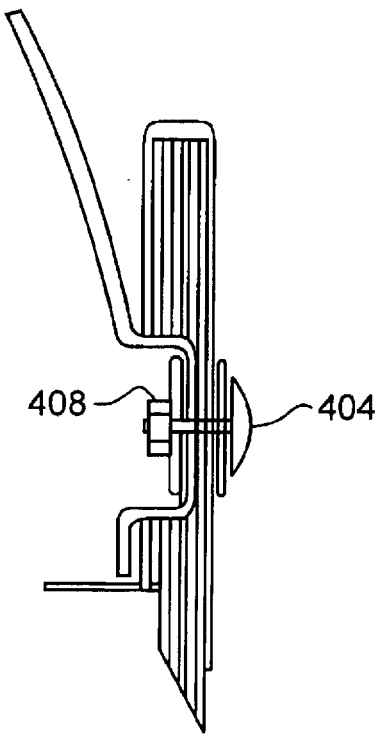
FIG. 15b is a diagram of a rotation mechanism of the retractable shield of FIG. 15a; and, FIG. 16 is a simplified diagram of the adjustable strap.

FIG. 15b shows a cross section view of the hinge in place. The bolt 404 goes through the perforation 405, 406 and then 407. The lock 408 secures the bolt.

Figure 16:
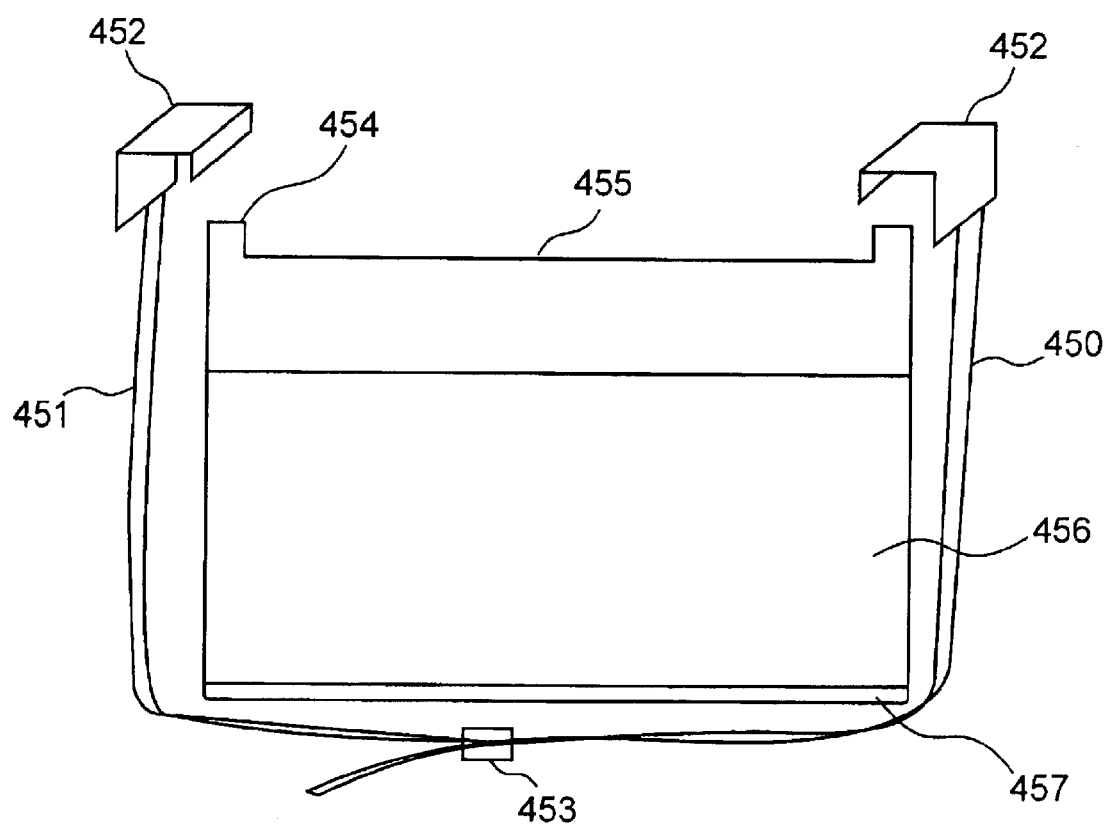

Referring to FIG. 16, a simplified diagram of the adjustable strap is shown. The strap comprises two elongated members 450 and 451. Each of the elongated members has an extremity having a C-shaped form for engaging the upstanding lips 454 of the molded compartments of the molded top tray 455. The other extremity located at the opposite end of the elongated member 450 comprises an adjustment mechanism 453. The other extremity located at the opposite end of the elongated member 451 is a finished end that engages the adjustment mechanism. Similarly, the C-shaped extremities of the elongated members engage the perforations of the removable clear shield to secure the shield on top of the top tray and to maintain the shield tightly along with the other parts of the box.

When the C-shaped extremities of the straps 450 and 451 engage the upstanding lips 454, the finished end of the elongated member 451 is passed in the adjustment mechanism and pull out to tighten the straps around the box. Optionally, a similar strap is used for tightening the folded front panels 323 and 324 of FIG. 13 to the bottom tray and the backside panels of the sidewall to the bottom tray and the top tray. In such circumstances, the C-shaped extremity of an elongated member engages the tightening piece 325 and the C-shaped extremity of the other strap engages an upstanding lip of the top tray.

Preferably, the straps are used to tighten the box in the assembled mode as well as in the disassembled mode.

Optionally, the box liner top and bottom portions are formed for mating in a stacking orientation one relative to another to act as effective storage boxes when not used for lining purposes.

Numerous other embodiments may be envisaged without departing from the spirit or scope of the invention.

What is claimed is:

1. A box liner comprising:
    a molded bottom plate having a bottom lip of a predetermined height formed about a perimeter thereof;
    a wall comprising at least one panel section including a plurality of panels and a hinge portion between two panels of the plurality of panels for permitting bending of the wall at the hinge portion for disposing the two panels with a relative angle therebetween, the two panels for having an end disposed adjacent the bottom lip with the hinge portion proximate a corner of the molded bottom plate, the portions for being biased by the bottom lip in an inward direction relative to an enclosure formed by the box liner and for being biased toward the bottom lip; and,
    a molded top for being disposed adjacent the wall and at a location opposite the bottom plate in an approximately parallel relationship thereto,
    whereby the top, the wall and the bottom plate when assembled form an enclosure therein allowing access within the enclosure.

2. A box liner according to claim 1, wherein the bottom lip comprises a groove for engaging a bottom edge of the plurality of panels when assembled.

3. A box liner according to claim 1, wherein the plurality of panels are formed of corrugated material.

4. A box liner according to claim 3, wherein the hinge portion between two of the plurality of panels comprises an approximately uncorrugated flexible portion including substantial continuations of at least one of the outer and the inner sheets of the panels adjacent to the hinge portion, said hinge portion for forming rounded corners of the box liner when the box liner is in an assembled mode and said hinge portion, when the box liner is in a disassembled mode, for allowing folding of the panels on top one to the other, and wherein when said molded bottom tray and molded top are arranged to provide a hollow space between said top and bottom plates, said hollow space for accommodating the continuous wall when so folded.

5. A box liner according to claim 1, wherein the at least one panel section consists of two panels attached by a hinge portion, the hinge portion for forming a substantially round corner.

6. A box liner according to claim 1, wherein the at least one panel section comprises three panels and two hinge portions.

7. A box liner according to claim 6, comprises an opening formed when the bottom edge of the plurality of panels of the at least one panel section is engaged within the groove, the opening for providing access within the enclosure.

8. A box liner according to claim 1, wherein the wall comprises two panel sections.

9. A box liner according to claim 8, wherein the two panel sections join by connecting an edge of a panel from one panel section to a edge of a panel from another panel section.

10. A box liner according to claim 9, comprises an opening formed when the two wall sections are assembled, the opening for providing access within the enclosure.

11. A box liner according to claim 1, wherein the molded top comprises a top plate surrounded by a top lip for engaging a top edge of the plurality of panels when assembled.

12. A box liner according to claim 11, wherein the top plate is molded for providing at least a compartment surrounded by an upstanding lip.

13. A box liner according to claim 11, wherein the top plate comprises a cutout thereby allowing access within the enclosure.

14. A box liner according to claim 13, wherein the opening is adjacent the cutout of the top tray.

15. A box liner according to claim 1, wherein the top tray comprises a removable shield.

16. A box liner according to claim 15, wherein the removable shield is a clear panel bendable on top of the top tray.

17. A box liner according to claim 1, wherein the top tray comprises a retractable shield connected to the top lip through rotatable hinge, the retractable shield for being disposed in a first position corresponding to a non-retracted position and in a second position corresponding to a retracted position; the rotatable hinge for allowing disposing the retractable shield in one of the first and the second position.

18. A box liner according to claim 1, comprises at least an adjustable strap for tightening the liner box in one of an assembled mode and disassembled mode.

19. A box liner according to claim 18, wherein the strap comprises an adjustment mechanism for performing one of tightening the liner box and other than tightening the liner box.

20. A box liner comprising:
    a molded bottom plate having a bottom lip of a predetermined height formed about a perimeter thereof;
    a continuous wall comprising a plurality of panels and a plurality of hinge portions therebetween for permitting bending of the continuous wall at these hinge portions for disposing the panels with relative angles therebetween, the continuous wall for being disposed adjacent the bottom lip for being biased thereby in an inward direction relative to an enclosure formed by the continuous wall and the molded bottom plate; and,
    a molded top for being disposed adjacent the continuous wall and at a location opposite the bottom plate in an approximately parallel relationship thereto,
    whereby the top, the continuous wall and the bottom plate when assembled form an enclosure therein allowing access within the enclosure.

21. A box liner according to claim 20, wherein the bottom lip comprises a cavity therein for engaging the continuous wall.

22. A box liner according to claim 21, wherein the cavity has a height smaller than the predetermined height.

23. A box liner according to claim 20, wherein the molded top comprises a top plate surrounded by a flange for depending with the continuous wall when the box liner is assembled.

24. A box liner according to claim 23, wherein the top plate comprises a cutout thereby allowing access within the enclosure.

25. A box liner according to claim 24, wherein the continuous wall comprises four panels and three hinge portions therebetween for permitting bending of the continuous wall at these hinge portions for disposing the panels with relative angles therebetween, the continuous wall for delineating an enclosure of an approximately rectangular perimeter, the access within the enclosure being provided by the cutout of the top plate.

26. A box liner according to claim 25, wherein the continuous wall comprises three panels and two hinge portions forming a gap such that the enclosure is partially surrounded by the continuous wall for providing access within the enclosure through the cutout of the top plate and the gap.

27. A box liner according to claim 20, wherein the continuous wall comprises three panels and two hinge portions therebetween for permitting bending of the continuous wall at these hinge portions for disposing the panels with relative angles therebetween, the continuous wall for delineating an enclosure of an approximately rectangular perimeter, the three panels for partially surrounding the enclosure on three sides leaving a side absent a panel for allowing access within the enclosure through the side absent a panel.

28. A box liner according to claim 27, wherein the top plate comprises a cutout allowing access within the enclosure through the top of the box liner.

29. A box liner according to claim 27, wherein the top plate is identical to the bottom plate.

30. A box liner according to claim 20, wherein the continuous wall comprises four panels and four hinge portions wherein a panel from the four panel comprises a cutout for providing access within the enclosure.

31. A box liner according to claim 30, wherein the top plate is identical to the bottom plate.

32. A box liner according to claim 30, wherein the top plate comprises a cutout adjacent the cutout of the panel.

33. A box liner according to claim 20, wherein the continuous wall comprises three panels.

34. A box liner according to claim 33, wherein each of the three panels comprise:
    an upper protrusion for being engaged within said depending flange; and,
    a lower protrusion for being engaged within said cavity, said panels being formed from plastic material having an outer sheet and an inner sheet held in spaced relation by a plurality of vertically oriented webs.

35. A box liner according to claim 34, wherein the hinge portions comprise an approximately uncorrugated flexible portion including substantial continuations of at least one of the outer and the inner sheets of the panels adjacent to the hinge portions, said hinge portions for forming rounded corners of the box liner when the box liner is in an assembled mode and said hinge portions, when the box liner is in a disassembled mode, for allowing folding of the panels on top one to the other, and wherein when said molded bottom tray and molded top are arranged to provide a hollow space between said top and bottom plates, said hollow space for accommodating the continuous wall when so folded.

36. A box liner according to claim 20, wherein the molded top comprises a top plate having a top lip formed about a perimeter thereof.

37. A box liner according to claim 36, wherein the top lip comprises a protrusion having dimensions for engaging the cavity of the bottom lip when the box liner is in the disassembled mode.

38. A box liner according to claim 37, wherein the at least three panels comprise:
    an upper panel cavity for engaging said protrusion from the top lip in the assembled mode; and,
    a lower panel protrusion for being engaged within said bottom lip's cavity in the assembled mode, said panels being formed from plastic material having an outer sheet and an inner sheet held in spaced relation by a plurality of vertically oriented webs.

39. A box liner according to claim 38, comprising an extension formed by a further continuous wall comprising at least three panels, wherein the at least three panels comprise:
    an upper panel cavity for engaging the protrusion from the top lip in the assembled mode; and,
    a lower panel protrusion for being engaged, in the assembled mode, within the upper panel cavity of the continuous wall, said panels form the extension being formed from plastic material having an outer sheet and an inner sheet held in spaced relation by a plurality of vertically oriented webs.

40. A box liner according to claim 35, wherein a panel located between the hinge portions corresponds to a back panel.

41. A box liner according to claim 40, wherein the back panel comprises an attachment system for securing the box liner to a surface of a minivan.

42. A box liner according to claim 39, wherein the extension comprises a panel located between the hinge portions corresponding to a back panel.

43. A box liner according to claim 42, wherein the back panel of the extension comprises a cut out for inserting a transparent panel.

* * * * *